UNITED STATES PATENT OFFICE.

JOHN EDWARD THORNTON, OF LONDON, ENGLAND, ASSIGNOR TO JOHN OWDEN O'BRIEN, OF MANCHESTER, ENGLAND.

CINEMATOGRAPH-FILM AND PROCESS OF MAKING THE SAME.

1,361,783. Specification of Letters Patent. Patented Dec. 7, 1920.

No Drawing. Application filed March 21, 1916. Serial No. 85,702.

*To all whom it may concern:*

Be it known that I, JOHN EDWARD THORNTON, a British subject, residing at West Hampstead, London, N. W., England, have invented certain new and useful Improvements in Cinematograph-Films and Processes of Making the Same, of which the following is a specification.

This invention relates to the production of cinematograph films both single color and multicolor.

The object of the invention is to produce transparent cinematograph films for optical projection by photo-mechanical printing instead of by photographic or photo-chemical printing as at present adopted and to produce such pictures of that high standard of technical quality usually associated with direct photography.

The invention consists in—for single color cinematograph films — photographing an original picture film through a single lens and producing a negative or positive therefrom by ordinary photographic methods, preparing or producing a printing belt therefrom by exposure by any of the processes known in photo mechanical printing such as intaglio, photo aquatint, mezzotint, photogravure, mezzotype, collotype or process analogous to photo lithography, and subsequently printing therefrom upon a transparent or other film or strip; each successive picture of the series being printed by mechanical means in an ink or color which will be absorbed into or adhere to the film, which may be of celluloid, gelatin, or other suitable material.

For multi-color cinematograph films:—photographing an original picture through a single lens upon a film prepared in the manner known for screen-plate photography, preparing a negative or positive therefrom in colors by ordinary photographic methods, preparing or producing therefrom a set of printing belts one for each color, by an exposure through a masking screen or a color screen or color filter by any process known in photo-mechanical printing such as intaglio, photo-aquatint, mezzo-tint, photogravure, mezzotype, or collotype or process analogous to photolithography and subsequently printing from each printing belt in succession, each successive picture of the series upon a transparent or other film or strip by mechanical means in an ink or color which will be absorbed into the film, or adhere to the film which may be celluloid, gelatin or other suitable material.

The invention also consists in the method of analyzing the color of the original screen plate pictures and in producing the single color printing belts.

I take original camera pictures upon a sensitized film or upon a film prepared with color lines, dots or other broken tone markings in any of the ways known as "screen plate color photography," through a single lens or objective, and a negative or positive is produced by ordinary photographic methods which I will hereinafter refer to as the original picture film.

"Screen plate color photography" may be defined, for the purpose of the present invention as the method described under this heading in an article commencing on page 468 of Cassell's *Cyclopedia of Photography*, published in 1912, and also in "*Farbenphotographie mit Farbraster Platten*" by Mebes, published in 1911 by Fernbach of Bunzlau.

I prepare a strip or band of copper, steel, brass, aluminium or other metal, or a strip of gelatin, the gelatin being on a supporting base, or a strip of celluloid with a coating of gelatin or other colloid prepared with a sensitive surface in any of the methods well known for photomechanical printing to receive an impression of the original picture film.

Upon the prepared strip, I produce a mechanical printing surface which I will hereafter refer to as a printing belt by photographically printing thereon from the original picture film by any of the methods hereinafter referred to.

Instead of printing direct upon the prepared strip the printing from the original picture film may be in a similar manner upon a transfer to be applied to the prepared strip.

Photo-mechanical printing is defined as follows:—The actual operation of printing requires neither the use of a sensitive surface nor the action of light, nor subsequent development. Instead of such methods printing is effected by mechanical pressure of the film against a plate (in the form of a continuous belt) which has been prepared with a series of images by one of the photo-mechanical processes.

The medium used to form the image is therefore a printing or applied ink or color instead of a sensitive salt. Various kinds of inks or colors can be used according to the particular type of engraved or other printing plate (hereinafter termed printing belt) used.

The following represent most of the processes available:—

*Relief processes.*—The belt is engraved in relief by the half-tone block process, the images being broken up into a series of dots varying in area and shape according to light and shadow. This belt may be a metal one, engraved in the usual way by printing on it by light in bichromated fish-glue, washing out and then etching. But I prefer to use a belt of celluloid or metal, coated with bichromated fish-glue or gelatin printed by light, developed by washing out and this image used as the relief printing plate direct. Or cast or molded reproductions of such printing belt may be used, such casts being made in celluloid, gelatin, or rubber, mounted upon a metal printing belt. Ink is applied to the raised points by rollers.

*Intaglio processes.*—The printing belt is engraved in intaglio by the processes known as photogravure, intaglio or reversed half-tone. The images for this process are produced by the same means (merely reversed) as used for preparing the engraved relief belt. Ink or color is applied to the intaglio image by a plush roller that completely fills it, and the surplus is wiped off the surface of the belt by a scraper, leaving the lines filled to the top with ink, which is afterward transferred to the film by pressure.

*Surface processes.*—These include all the variations that come under the head of planographic processes, which depend upon the opposition of an image in fatty ink to moisture, such as collotype, photo-litho, zincography, algraphy and the like. For collotype the image is formed by the printing belt being covered with a layer of bichromated gelatin printed by light, and washed to remove surplus bichromate. It is then treated with glycerin or various moisture-retaining solutions which are absorbed by the soft gelatin portions of the image not affected by light and repelled by the hardened light-affected portions. When ink or color is then applied by inking rolls, the ink adheres only to the dry parts and is repelled by the damp portions. It is then transferred to the film by pressure. Such a printing belt can be made of celluloid or metal. For photo-litho, zincography, algraphy and the like processes a grained metal belt is used, though in certain circumstances grained celluloid may be substituted.

*Reversed collotype.*—For this process the printing belt is prepared similarly to collotype, but comprises a perforated backing or foundation which acts as an ink or color reservoir, being fed with a watery or spirit ink or dye from behind, which therefore passes through the perforations, and through the porous soft gelatin parts of the image, but not through the hardened parts, and is then transferred to the film by pressure.

*Hydrotype.*—For this process the printing belt of celluloid is made with a bichromated gelatin image in relief, prepared by exposure to light under a negative through the celluloid backing and then developed with hot water from the front thus yielding an image in varying degrees of relief. This is then soaked in watery ink (a solution of dye) which is then transferred to the film by pressure maintained for a long enough period to transfer sufficient dye.

By a variation of this hydrotype principle, known as pinatype, the bichromate image is not developed into relief after exposure, but after washing out the surplus bichromate the soft parts of the gelatin are dyed up instead of the hardened parts, the dye being next transferred by pressure as before. In still another variation of this principle, known as the Donnisthorpe process, the hardened parts of the image are dyed.

For single color or monochrome films the printing from the original picture film upon the prepared strip to produce the printing belt is done by any of the methods hereinbefore referred to.

For multi-color films, the printing from original picture film which is a "screen plate film" of two, three or more colors is done directly or indirectly through a sequence of appropriate color filters, one for each color, upon a corresponding number of prepared strips. Thus from a three color original picture film, three separate printing belts are produced, each carrying the section or part of the picture in one color.

Where the original picture film is taken upon a screen plate or screen surface composed of parallel colored lines (for example red, green and blue when there are three colors, and blue, green and orange-red when there are two colors) in regular sequence over the picture area each screen through which the printing belts are prepared comprises opaque lines with transparent spaces each opaque line being in the case of a three color system of such a width as to cover two color lines on the original picture film while the next adjacent transparent spaces leaves uncovered or unmasked the third color-line on the original, one color element of the original picture film being thus unmasked and visible throughout say for instance the red lines. A contact or camera impression is now made on the surface preferably a surface that is specially sensitive to the red which will involve the red lines, but this impression or image will be imperfect as only covering one-third the area of the sensitive surface. To remedy this and completely cover the whole area of the sensitive surface there must be two appropriate shiftings of the screen and the original on the one hand or of the sensitive surface on the other hand, so that the impression line is repeated twice on the blank part of the sensitive surface, and thus the sensitive surface is filled or completely covered with one elemental picture of the trichrome system. The appropriate shiftings are as follows:—The original and the line screen which is in contact therewith, and which masks two lines out of three of the original, are together advanced in a direction normal to the lines and to a degree or equal to the width of one original color line, or to express it otherwise equal to the width of a transparent space of the masking screen. An exposure being now made, one half of the blank space on the sensitive surface is covered and by another similar movement of the original and the masking screen conjointly and a third exposure the whole of the sensitive surface becomes covered and a complete image is obtained of one color element of the original picture film. In the case of an original on a two color system, the masking screen must have equal lines and spaces, and further but one shift is required. Alternatively the sensitive surface may be similarly moved two steps each step being the width of a line as depicted thereon; an exposure being made after each shift. One color element having been thus analyzed out or depicted on a separate printing belt, the two remaining color-elements are analyzed out in a similar manner each on a separate prepared printing belt. Alternatively instead of operating directly on the printing belt this selective printing may operate upon an intermediate belt whether positive or negative from which to produce the printing belt. Thus from the original screen plate picture film are obtained the desired number say three single color printing belts each representing or corresponding to one color section or element of the original picture.

If the above described process of three part production (or alternatively two part reproduction) be carried out with strict exactness each reproduction will be a smooth and even picture without any line effect but in practice some lines may partially overlap and others may partially miss thus producing an irregular lined effect. To minimize this defect two courses are available one being to use a masking screen the broad opaque lines of which are somewhat vignetted or weakened at the edges, and another course is to so repeatedly vary or alter the course or direction of the light during exposure as to produce such diffusion as is allowed by the thickness of the images or parts or screen, or this thickness may be supplemented by the interposition between the original and the masking screen, of a thin film of celluloid or the like.

When the color screen in the original picture film is composed of slightly curved lines of equal width the above described method of analyzing out each elemental color in the production of the several printing belts will apply.

When the color screen in the original picture film is composed of or plotted out in complex geometric pattern of lines of unequal width or of intermingled lines and squares or rhomboids, as for example, such screens as are shown by Figs. II, III, V and VI of Tafel of Dr. Mebes's book, mentioned above, the method of repeatedly shifting the masking screen in the preparation of the several printing belts applies less completely and recourse should be had to extension of the area of illumination by repeatedly altering or varying the course or direction of the light during exposure.

When the color screen in the original picture film is composed of random or mixed dots of color such as produced by colored starch grains, an intermediate masking screen is not required in producing the several printing belts, but for producing each printing belt a color filter is interposed which will (as in an ordinary case of three color work) absorb two of the colors and permit only one color to pass and be impressed upon the printing belt or an intermediate cliché film. During printing to obtain an extension of each starch grain or color unit to eliminate the original screen grain the light may be shifted, such for instance as around a line normal to the middle point of the original. A distance piece of thin transparent film and the printing belt to allow the diffusion of light may be employed. This transparent film may be of corrugated or crimped celluloid formed by flowing the celluloid on to a finely grooved or lined plate. It should be understood that the color screens and the general procedure should be in accord with the general principles, methods and instructions in standard works on three part or multiple part heliochromy, among which works may be mentioned "*Three Color Photography*" by Von Rübl, translated by Klein and published by Penrose and Co.

It is to be understood that instead of taking the original picture upon a film of the screen plate type such as described the pictures may be taken on two or three separate films or as sequent groups on a single film, thus producing an original picture film for each color and in this case a printing belt will be produced from each original picture film or sequence as in the case of a single color or monochrome original.

In preparing printing belts from the original picture film more particularly of the individual elemental colors two or more of such printing belts may be made from each, one lightly exposed for the dense parts and the other fully exposed for the lighter tones. By printing from one or other of these printing belts or from both in succession a high degree of tint is reached and desirable or special effects for harmonizing harshness or other defects becomes practicable. Or one of such printing bands may be used for printing say a light shade or tone of blue or a greenish blue, and another for printing a deep blue or a purple blue to give better effect to the colors in the picture. This mode of operation is regarded as of special importance in relation to originals produced by the two-color process.

The original picture film is perforated in the ordinary way prior to producing cinematograph negatives and the metal or other strip which is to form the printing belt is perforated in a corresponding manner along both edges, and the print or impression from the original picture film is made in a machine similar in construction and suitably adapted for the purpose to those at present regularly employed for the printing of cinematograph films or in any other machine designed or adapted for the purpose.

*The printing belts.*—The printing belt is made of a long strip of metal, celluloid or other material with the pictures etched thereon either in intaglio or relief by well known methods, or any one of the published and current procedures for making a relief or intaglio printing surface. Alternatively bands molded or formed in rubber, celluloid, gelatin or like may be employed. A process for forming a printing surface of actual hardened gelatin is the Leimtype of Husnik which is briefly described on pages 330 and 331 of Cassel's *Cyclopædia of Photography* published in 1912 and further a description is given in Husnik's British specification No. 37 of 1887. To obtain the most satisfactory results by the Leimtype process certain improvements and modifications are desirable and these as hereinafter described must be regarded as a part of the present invention. The film base is a flexible band of metal, celluloid or other material grooved or perforated to promote the adhesion of the gelatin with which it is coated, this coating being on one side or both, and the gelatin having been sensitized and printed and treated in accordance with the Husnik method gives a grained typographic surface, but when an intaglio surface is required the exposure should be under a lined or grained dia-positive.

A printing belt having a base of celluloid is coated with a sensitized resist (as for example bichromated fish glue) similar to that used on metal for ordinary process work. I print upon it from the original picture film and after exposure, followed by washing out in the usual way, the celluloid is etched by an air blast or a sand blast charged with a solvent of celluloid such for example as amyl-acetate.

To prepare a printing belt by the collotype process the band may be either metal, celluloid or other waterproof material coated with a layer of gelatin or other colloid of a hard kind and to promote the adhesion of the gelatin the band may be corrugated grooved perforated or roughened. Or as a preferred method the band may be stamped or cut with numerous small and closely grouped slits or perforations into which the gelatin will penetrate, and the slits are best cut with a sharp chisel while the material rests on soft and even metal surface. Further by using a chisel with several minute gaps in it each slit becomes imperfect; the imperfections affording a desirable unity and strength to the band. This method has the advantage of allowing water or glycerin or other liquid to be applied to the gelatin layer from the back of the band. The picture from the original picture film is printed upon the gelatin layer and treated as in the ordinary collotype process to produce a printing surface.

A printing belt prepared by the collotype process as above described has advantages in relation to the subsequent printing of the cinematograph film therefrom in that a stiff water color or water glycerin color may be used instead of the usual fatty or printers' ink, as described in the eleventh article of a series of articles on photocollotype in the British *Journal of Photography* for 1879; this eleventh article commencing on page 410 of the volume, and the description of the use of stiff water-color inks being on p. 411.

The printing belt may be prepared by the reversed collotype process known as hydrotype or pinatype. This method allows of a certain amount of diffusion of the color in the gelatin layer but does not yield extremely sharp images and is therefore better suited for the red image and the yellow image printing over a direct cyanotype or other direct sharp photographic image than for all the three stages of a color film as applied to the procedure hereinafter referred to under the heading "Modified printing." For this form of hydrotype a grained or cross hatched or grooved celluloid band is desirable the slight grain resulting therefrom tending to merge into a tone while the graining promotes the adhesion of the gelatin layer. Grooves having vertical sides are specially favorable for giving the gelatin a firm hold on the celluloid.

It is to be understood that in the subsequent production or printing of the cinematograph film where there is superimposition of colors or prints some of the printing bands may be made by one process and some by another process and used in such a way as to give the best results.

In the preparation of printing belts by any of these methods in which a screen is employed it is desirable that the screen should be moved slightly—relatively to the belt—either laterally or longitudinally or both after each individual picture is exposed so that the dots or points printed upon the cinematograph film will not fall in the same place in the successive pictures and so owing to the rapidity of projection and the persistence of vision such dots or points will not be visible on the enlargement when projected upon a sheet or screen the picture appearing as a full tone grainless picture.

*The cinematograph film.*—The strip or film upon which the pictures are to be printed from the printing belts to produce the finished cinematograph film may be of the ordinary celluloid material now employed for cinematograph films or any other transparent film material.

The celluloid or cellulose materials now employed are expensive and one advantage of the present invention is that a transparent film of a much cheaper material (for example a non-waterproof colloid such as gelatin) may be used notwithstanding that such is not waterproof and consequently cannot be used for photo-chemical printing, yet it forms a good base for mechanical printing. This material is fireproof and its degree of non-inflammability under the conditions that cinematograph films are used is far in advance of the so-called non-inflammable cellulose acetate films. The base film may be hardened by any of the substances generally used for that purpose, such as chrome alum, formalin, or the like, either by incorporating them with the gelatin base before it is cast, or by applying to it a solution thereof after casting and before drying; or even after drying, which involves re-drying but possesses certain advantages.

Mixtures of different colloids may be used instead of or in addition to gelatin, in order to secure strength cheapness or other advantages. And suitable substances for securing flexibility may also be added, such as sugar, glycerin, or molasses, or the soft commercial "fish glue". In order to secure increased strength with decreased absorption, and yet still retain the main features of a non-water proof colloid base, the gelatin may have incorporated therewith a small proportion of the fibrous soluble cellulose—either nitrate or acetate (but preferably acetate)—which can be easily incorporated in such a manner as to not materially affect the distinguishing qualities or transparency of the colloid base, also any salts that will render it more fire resisting such as borates, silicates, or tungstates. The methods of effecting such mixtures are well known.

The film base is formed by first making a solution of suitable colloid such as gelatin. It is not necessary to use an expensive grade such as is required for sensitive protographic emulsions, and the very cheap qualities have been found to be quite good enough. Other colloids such as glue, isinglass, agar-agar, albumen, viscose, alginates, or the like may be used in combination.

If gelatin alone is used the solution, while warm, is applied to any suitable polished surface, either by coating, pouring, flowing or spreading by any of the different methods of coating adopted with colloid solutions. To assist even flowing a small amount of alcohol may be added to the solution.

Immediately after coating (the polished surface being preferably kept in a horizontal position) the warm solution chills and sets as a stiff jelly. In this condition it is then allowed to dry slowly by means of a current of warm air, at a temperature insufficiently high to cause re-melting. When dry it is stripped as a complete film from the polished temporary support.

Such a film will be practically fireproof in the sense commonly understood by users of celluloid films. This does not mean that such film is incombustible but means that it will not fire spontaneously from the heat of the lantern during projection whenever its movement through the projector is temporarily arrested. The application of naked flame to such film would only result in its being burnt to a charred black mass, whereas a celluloid film would be destroyed instantaneously.

Various methods of coating, forming or casting the film base may be adopted, such as by utilizing a polished surface such as a long web of celluloid, which, after coating, may be wound in helical form upon a drying reel with air spaces between each fold; or the polished periphery of a very large rotating drum may be used, in conjunction with a series of polished heated drying cylinders around which the film is led after leaving the casting drum; or an endless polished moving belt may be used, which acts both as the casting and drying surface.

After removal of the dried film from any of these surfaces the latter are perfectly cleaned and coated with a suitable stripping substratum before using again.

Before the operation of printing the image on such film (to be hereinafter described) it may be necessary to prepare the film with a sufficiently receptive surface, such as a substratum of soft gelatin laid on top of the hardened film. This is therefore coated on before the film is stripped from its support.

Such substratum may be rendered still more receptive and suitable for the subsequent operations by the addition of glycerin or molasses to make it absorbent, or by the addition of a graining material.

Or if preferred the film itself may be prepared direct in this way and the hardening materials and substratum dispensed with, the film being hardened at a later stage, after printing, either by passing between rolls covered with felt saturated with formalin, chrome alum, or other hardening solution, or else by passing it through a chamber containing formalin vapor. In either case the film is next passed around heated drying rolls or through a heated drying chamber.

The film web is cut into narrow ribbons for cinematograph films by the usual slitting machine, and is then perforated with the usual feed-perforations by any ordinary form of perforating machine.

It may be preferred in many cases to water-proof the film entirely, and if so this may be done either before or after prining. I prefer to do it before printing and to then make the print upon the waterproof surface instead of upon the film direct. In such a case the printing ink must be selected in reference to the waterproof coating.

Such waterproofing operation may be effected by applying any suitable waterproof varnish, such a dilute oil varnish or celluloid varnish, (but preferably of the non-inflammable variety containing cellulose-acetate instead of cellulose nitrate). The film is run rapidly through a bath of the varnish (or the varnish may be applied by any known coating machine to one or both faces at a time), then through a heated drying chamber to finish. Any surplus that may accumulate in the perforations is removed by passing the film in front of an air blast or else a suction box provided with a moving perforated belt. In this way the surplus is readily removed without disturbing the otherwise even coating.

*Mechanical printing of cinematograph films.*—In the mechanical printing of the films from the printing belts herein described any suitable ink or color may be employed that is adapted to the particular form of printing belt and the surface of the film upon which the print is to be made.

To prevent or minimize adhesion when damp gelatin is printed from, the receiving surface may be coated or sprayed with animal bile, or a solution of the commercial purified " ox-gall." The printing may be done by applying the ink to the printing belts by any well known printing method such as by a roller and in the case of intaglio band removing the excess by a doctor or knife. The printing belts with perforations in which registering pins can operate and the film also similarly perforated are drawn together between rollers or pressing surfaces by which contact or pressure will be applied picture by picture. Sprocket teeth or claws are fitted to draw the two through the machine in correct register. A machine not forming part of this invention is being designed for the purpose and will form the subject matter of another application.

*Modified printing.*—It will be understood that the cinematograph film may be wholly printed by the mechanical method from one or more of the printing belts herein described or it may be only partially so printed over a key picture or over a single color picture previously photo-chemically printed on the film in order to secure results of better quality and with greater sharpness of detail. The photo-chemically printed key picture will preferably be gray instead of black to avoid over-powering the colors subsequently superimposed thereon. Or the key picture may correspond to one of the elemental colors of the heliochrome picture. Alternatively this key may be the blue picture or element on which such blue picture may be produced by the well known iron process whether direct or through the intermediary of a silver image.

Instead of using a toned silver image for one section of a color picture such photographic image may be printed by the carbon-bichromate or by the pinatype dyed-bichromate method, whereby the color is obtained by direct development without subsequent toning. The same methods may be adopted for a black or gray key.

To secure the best results it is advisable to coat the photochemical image after it has been developed and washed (and if necessary also dried) with a thin layer of varnish as a substratum that will more readily take the subsequent greasy or aqueous inks or colors. This substratum may be of gelatin, albumen, celluloid, resinous varnish, or the like, and should preferably contain any suitable material that will give it an extremely fine grain or tooth when dry. This substratum is all the better if made suitably absorbent of the printing ink, in order to facilitate drying of the latter.

To insure accuracy of registration of the several superimposed images all films for negatives or positives are accurately perforated by the same machine, and the printing belts that apply the greasy-ink images are likewise perforated to correspond. Shrinkage of the film carrying the photographically printed image is compensated for by suitable adjustments of the relative positions when applying the superimposed image.

What I claim as my invention and desire to protect by Letters Patent is:—

1. A process of producing continuous lengths of transparent cinematograph films printed with half tone or grainy pictures, each picture throughout the series comprising all the range of tones and all the gradations of a photograph, as distinguished from solid patches of color without gradation, such gradation of tones from lightest to darkest consisting of broken tone images formed by exceedingly small dots, lines, patterns or grains, which comprises preparing a printing belt of continuous length from a photographically prepared film through interposed means for converting a full tone image on such film into a broken tone image on the belt, printing from such prepared printing belt with an applied ink to produce a half tone picture in ink upon a transparent length of film, and maintaining the printing belt and the film in proper registration during such printing by the aid of perforations in said belt and film.

2. A process of producing continuous lengths of transparent cinematograph films having thereon pictures possessing the characteristics described in claim 1, which process comprises preparing a printing belt of continuous length from a photographically prepared film through interposed means for converting a full tone image on the film into a broken tone image on the belt, printing from such prepared printing belt with an applied ink to produce a half tone picture in ink upon a transparent length of film, maintaining said belt and the film printed upon it in proper registration during the printing operation by perforations in said belt and film, and shifting the incidence of the broken tone markings in each successive picture of the series to produce the effect to the eye of an observer of a full tone picture when projected upon the screen.

3. The improved process of producing cinematograph pictures which comprises preparing a series of ordinary full tone images splitting up such images by making a printing belt reproduction therefrom in such manner that the images are converted into broken tone markings, and printing from such belt onto continuous lengths of transparent cinematograph film by applied ink and pressure to produce pictures in broken tone markings of printer's ink.

4. The improved process of producing cinematograph pictures, which comprises preparing a series of ordinary full tone film images splitting up such images by making a printing belt reproduction therefrom in such manner that the images are converted into broken tone markings, and successively staggered formations, and printing from such belt onto continuous lengths of transparent cinematograph film by applied ink and pressure to produce pictures in broken tone markings of printer's ink, which split images will be constructed in full tone formation, similar to the original, when projected onto a screen.

5. In a process for producing by mechanical printing continuous lengths of transparent cinematograph films as set forth in claim 1, the method of intensifying parts of the pictures by one or more additional impressions or printings of the same pictures from a different set of clichés bearing more or less of the total picture.

6. In a process for producing by mechanical printing continuous lengths of transparent cinematograph films as set forth in claim 1, the method of producing multi-color heliochrome prints by printing each color one on top of the other from different printing belts, and of intensifying portions of the picture by additional impressions from a different belt, but in the same color, or in a different shade of the same color, in order to give the effect of a greater number of colors.

7. A process of producing by mechanical printing continuous lengths of cinematograph films having thereon pictures possessing the characteristics described in claim 1, which comprises preparing a plurality of printing belts of continuous lengths from a photographically prepared film, through interposed means for converting a full tone image on such film into broken tone images on the printing belts, printing from such prepared printing belts with an applied ink, onto a transparent length of film, to produce pictures with broken tone markings thereon, and maintaining the printing belts and the film in proper registration during such printing.

8. In processes for producing by mechanical printing continuous lengths of cinematograph films as set forth in claim 1, which comprises preparing a plurality of printing belts and shifting the incidence of the broken tone markings of every picture on each printing belt for each superimposed impression in multi-print monochrome or multi-color pictures, in order that the visible markings on the printed film shall be obliterated and the picture produced from a grainy half-tone is made to look like a complete full-tone without visible broken tone markings.

9. In a process for producing by mechanical printing continuous lengths of cinematograph films as set forth in claim 1, which comprises preparing a plurality of printing belts and shifting the incidence of the broken tone markings of every picture on each printing belt for each superimposed multi-impression, the impressions for the different printing belts being made from inks of different consistency or of different shade to secure special effects, longer scale of gradation, and intensified shadows.

10. In a process for producing by mechanical printing continuous lengths of cinematograph films as set forth in claim 1, which comprises preparing a plurality of printing belts and shifting the incidence of the broken tone markings of every picture on each printing belt for each superimposed multi-impression color picture, made from differing printing belts, whereby the respective colors have been suitably analyzed.

11. In a process for producing by mechanical printing continuous lengths of cinematograph films as set forth in claim 1, which comprises preparing a plurality of printing belts and shifting the incidence of the broken tone markings of every picture on each printing belt for each superimposed multi-impression color picture in which the scale of gradation and number of colors is increased by making two or more differing printing belts from each color section of the original, each having a different gradation or a different position of the image, filtered out, and printing them superimposed in a different shade of ink of the same color.

12. A continuous length of fireproof cinematograph film made from gelatin varnished to render it non-inflammable and waterproof, having broken-tone markings which are displaced or staggered in each superimposed impression of multi-impression type, for the purpose of obliterating the visible pattern and producing a full-tone effect when the picture is projected.

13. A continuous length of transparent cinematograph film having a series of images printed on its face in broken tone markings of printer's ink, and an atmosphere-resisting varnish applied to both faces after printing to protect the ink-printed images.

14. A continuous length of transparent cinematograph positive film in a plurality of printings, comprising a succession of photo-mechanical prints of broken tone markings in printer's ink superimposed upon each other and with displacements of the markings in each successive print.

In testimony whereof I have hereunto set my hand in presence of two subscribing witnesses.

JOHN EDWARD THORNTON.

Witnesses:
  I. OWDEN O'BRIEN,
  ROBERT W. WOOD.